C. N. KNAPP.
BROILER.
No. 177,132. Patented May 9, 1876.
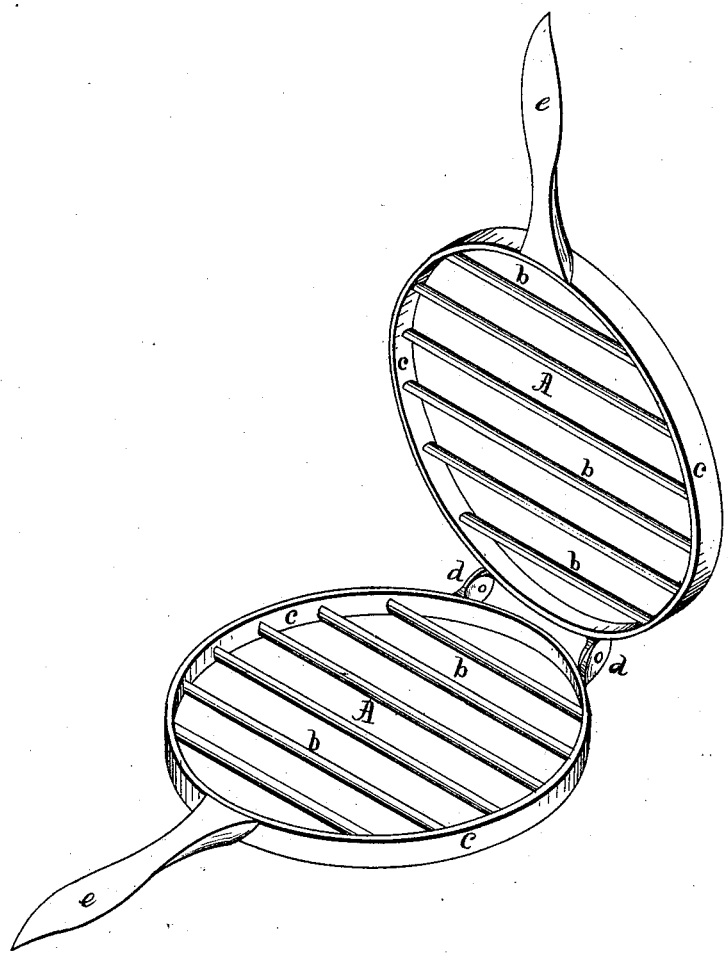
Witnesses:
Jas. A. Nixon
Ned. E. Knight
Inventor:
Clarence Nelson Knapp

UNITED STATES PATENT OFFICE.

CLARENCE N. KNAPP, OF CUYLER, NEW YORK.

IMPROVEMENT IN BROILERS.

Specification forming part of Letters Patent No. 177,132, dated May 9, 1876; application filed February 29, 1876.

*To all whom it may concern:*

Be it known that I, CLARENCE N. KNAPP, of the town of Cuyler, Cortland county, and State of New York, have invented a new and useful Improvement in Meat-Broilers, called "Knapp's Patent Broiler," which improvement is fully set forth in the following specification, reference being had to the accompanying drawings.

My invention consists of an improved reversible meat-broiler or bread-toaster, consisting of two circular sections, A A, made of any size to fit the griddle openings of any stove, with narrow bars $b$ $b$ running parallel with each other when the broiler is closed, the bars $b$ $b$ being beveled to a sharp edge, so as to expose to best advantage the surface of the meat to the fire. The rims $c$ $c$ of each section are beveled down, so as to fit in the grooves of the stove, and thus steadily support the broiler when being used, and prevent the juices of the meat from escaping and burning upon the top of the stove. The bars $b$ $b$ are placed in about the center of the rims $c$ $c$, thus leaving ample room for the meat between the two sections A A, and leaving the outer edges of the rims raised a little above the bars, so as to securely hold any cover to the broiler made to set down inside of the rims. The two sections A A are fastened together at the back side by a double hinge, $d$ $d$, each hinge consisting of two projections, inseparable from the respective rims of the sections, and so attached to the rims and to each other that the upper section of the broiler will open back to an upright position and there remain, and not fall back upon the stove. The handle consists of two sections, $e$ $e$, inseparable from the respective sections A A, and so attached to the contiguous edges of the rims that they join evenly together when the boiler is closed, thus constituting a single symmetrically-shaped handle, the outer ends of each section of the handle being turned from each other, thus making the broiler easily opened. The whole broiler, excepting the wire or rivets in the hinges, is composed of only two main pieces, A A, each section being entire. The bars $b$ $b$ are either cast-iron—the same as the entire broiler—or wrought-iron bars or wires cast into the sections A A.

What I claim as my invention is—

The beveled rims $c$ $c$, handles $e$ $e$, stop-hinges $d$ $d$, and bars $b$, all combined and arranged substantially as and for the purpose set forth.

CLARENCE N. KNAPP.

Witnesses:
    JAS. A. NIXON,
    FRED. E. KNIGHT.